J. TRAGESER.
Beer Cooler.
No. 33,967.
Patented Dec. 17, 1861.
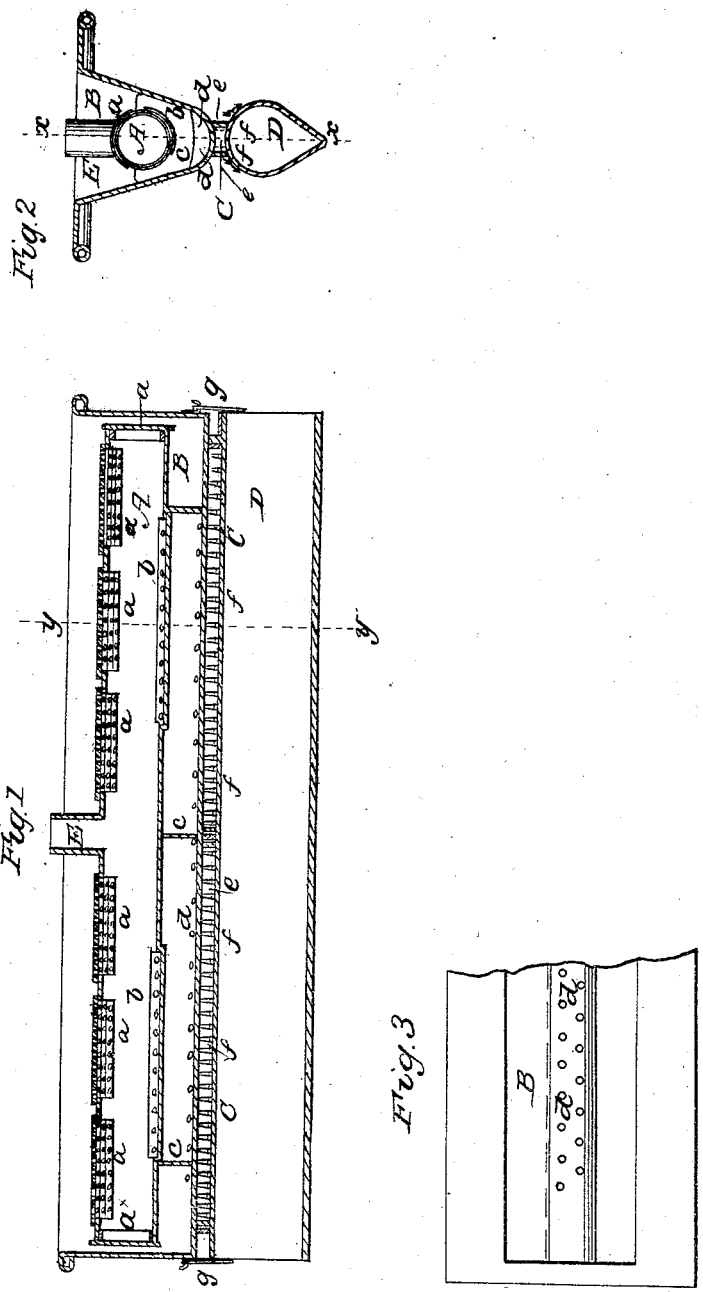
Witnesses
Richardson Gawley
Charles Holden
Inventor
John Trageser

UNITED STATES PATENT OFFICE.

JOHN TRAGESER, OF NEW YORK, N. Y.

IMPROVEMENT IN BEER-COOLERS.

Specification forming part of Letters Patent No. 33,967, dated December 17, 1861.

*To all whom it may concern:*

Be it known that I, JOHN TRAGESER, of the city, county, and State of New York, have invented a new and Improved Beer-Cooler; and I do hereby declare that the following is a full, clear, and exact description of the same, reference being had to the accompanying drawings, forming part of this specification, in which—

Figure 1 is a longitudinal vertical section of my invention, taken in the line $x\ x$, Fig. 2; Fig. 2, a transverse vertical section of the same, taken in the line $y\ y$, Fig. 1; Fig. 3, a detached plan or top view of a portion of a vessel pertaining to the same.

Similar letters of reference indicate corresponding parts in the several figures.

This invention relates to a new and improved apparatus or device for cooling wort in the process of brewing, and has for its object the perfect straining of the wort after leaving the boiler and previous to its distribution over the cooling-tubes.

The invention has further for its object a more perfect distribution than usual of the wort over the cooling-tubes, so that it may be cooled rapidly, without waste by splashing, and be made to enter the fermenting or "gyle" tun in the best possible condition for the subsequent process of fermenting.

The invention consists in the employment or use of a horizontal tube, which receives the wort from the boiler, and is perforated chiefly at its upper surface, fitted within a suitable vessel having a perforated bottom, and provided at its under side with serrated flanges which are directly over the upper cooling-tube, all being arranged as hereinafter shown and described to effect the desired result.

To enable those skilled in the art to fully understand and construct my invention, I will proceed to describe it.

A represents a tube, which may be of any suitable dimensions, constructed of copper, and perforated at its upper part, as shown at $a$, to form a strainer, the perforations extending the whole length of the tube, as shown clearly in Fig. 1. The tube A has a few perforations $b$ in its under side and near each end, as also shown in Fig. 1. The tube A may be of copper, at least that would be the preferable material, and it is fitted within a copper vessel B, which is about equal in length to the tube and is transversely of V form, as shown clearly in Fig. 2. The tube A does not rest upon the bottom of the vessel B. It is supported at a suitable height therefrom by flanges $c$, which are attached to the under side of the tube. (See Figs. 1 and 2.) The tube A may be provided with removable heads or ends $a^\times$, for the convenience of cleaning it when necessary.

The bottom of the vessel B is perforated with two longitudinal rows of holes $d\ d$, (see more particularly Fig. 3,) and to the under side of the bottom of the vessel B there are attached pendent flanges $e$, which may be described as forming two narrow boxes C C with open bottoms, the boxes extending nearly the whole length of the vessel B, so as to take in all the perforations $d\ d$. (See Fig. 1.) The lower edges of the sides of the boxes C C are serrated or notched, as shown at $f$ in Figs. 1 and 2.

D represents a cooling-tube, which is of copper and equal in length to the vessel B, and said tube in its transverse section is of semicircular form at its upper part and of V form at its lower part, as shown clearly in Fig. 2. A series of tubes D are employed, one below the other, all being in the same vertical plane and connected at their ends by curved joints, so that there will be a direct passage for water to pass through the whole series of tubes and keep the same in a cool state. As the tubes D are all of the same form, a representation of one of them is sufficient. The lower edges of the boxes C C are in contact with the upper surface of the upper tube D, as shown in Figs. 1 and 2.

The operation is as follows: The wort passes from the boiler through a pipe E into the tube A, and is forced by static pressure through the perforations $a$, which serve as strainers and separate particles of hops and other foreign substance from the wort. These substances being retained in the tube A, the liquid may drain from them through the lower perforations $b$, as said substances on account of their superior gravity will settle to the bottom of A. The wort by this arrangement is strained in a perfect manner, as the foreign substances are not liable to be forced through the perforations $a$, on account of the latter being at the upper side of the tube. The strained wort passes through the holes $d\ d$ in the bottom of the vessel B, fills the boxes C C, and escapes therefrom through the notches $f$ in the lower edges of the boxes C C. The notches $f$ perform an important function—to wit, they cause the wort to be discharged from the boxes C C in fine small jets, which are distributed along the whole length of the upper cooling-tube D, and the wort consequently trickles down over the whole surface of said tube and passes in this manner from one tube D to another and is rapidly cooled by said tubes, the latter being kept in a cool state by the flow of cool water or ice water through them, as previously alluded to. The two rows of holes $d\ d$ in the bottom of the vessel B are important, as they cause the wort to be discharged from the vessel B over a greater area and insure a more uniform flow of the wort or a more uniform distribution of the flow than a single row of larger holes. By this arrangement all splashing of the wort is avoided in its passage from the boiler to the fermenting or gyle tun, and the wort is rapidly cooled and in a perfect manner.

I do not claim, broadly, the cooling of wort by passing the same over water-pipes, for that has been previously done. Neither do I claim any parts which might be considered as being covered by the patent of J. L. Baudelot, bearing date November 1, 1859; but I do claim as new and desire to secure by Letters Patent—

1. A strainer for a wort or beer cooler formed of a tube A, perforated at its upper part, as shown at $a$, and used with or without the perforations $b$, substantially as and for the purpose set forth.

2. Providing the vessel B, in which the tubular strainer A is placed, with narrow boxes C C, one or more, at its bottom, the boxes having notched edges and arranged in relation with the upper cooling-tube D, to operate as and for the purpose herein specified.

3. Having the bottom of the vessel B perforated with two rows of holes $d\ d$, when said perforations are used in connection with the boxes C C, for the purpose set forth.

4. The combination of the tubular strainer A, vessel B, with its perforated bottom, the boxes C C, attached to the under side of the bottom of B and notched, as shown, and the cooling-tubes D, all arranged as and for the purpose specified.

JOHN TRAGESER.

Witnesses:
RICHARDSON GAWLEY,
CHARLES HOLDEN.